United States Patent [19]

Dietz et al.

[11] Patent Number: 4,613,076
[45] Date of Patent: Sep. 23, 1986

[54] APPARATUS AND METHOD FOR FORMING FINE LIQUID METAL DROPLETS

[75] Inventors: Peter W. Dietz, Delanson; Russell S. Miller, Rexford, both of N.Y.

[73] Assignee: General Electric Company, Schenectady, N.Y.

[21] Appl. No.: 780,138

[22] Filed: Sep. 26, 1985

Related U.S. Application Data

[63] Continuation of Ser. No. 580,321, Feb. 15, 1984, abandoned.

[51] Int. Cl.[4] .............................. B01J 2/04; B05B 5/04
[52] U.S. Cl. ........................................ 239/3; 239/703; 264/8
[58] Field of Search ................... 239/3, 699, 700, 703; 264/8

[56] References Cited

U.S. PATENT DOCUMENTS

| | | | |
|---|---|---|---|
| 2,897,539 | 8/1959 | McMillan | 264/8 |
| 3,499,745 | 3/1970 | Plumat | 264/8 X |
| 3,720,737 | 3/1973 | Klaphaak et al. | 264/8 |
| 4,027,718 | 6/1977 | Lundgren | 164/46 |
| 4,215,818 | 8/1980 | Hopkinson | 239/3 |

FOREIGN PATENT DOCUMENTS 2043701  10/1980  United Kingdom .

Primary Examiner—Andres Kashnikow
Attorney, Agent, or Firm—Bernard J. Lacomis; James C. Davis, Jr.

[57] ABSTRACT

An apparatus for generating fine liquid metal droplets from a liquid or molten metal comprises a rotatable member situated in a pressurized or evacuated chamber. Means are provided for generating an electric field at the edge of the member having sufficient strength to overcome the surface tension of the metal. A liquid metal delivery means directs liquid metal onto a surface of the member over which the metal flows toward the edge as the member is spun. As the liquid metal leaves the surface at the edge, the force of the electric field causes fine liquid metal droplets which are more uniform and smaller than those produced without an electric field to form. A method for forming fine liquid metal droplets is also disclosed.

23 Claims, 4 Drawing Figures

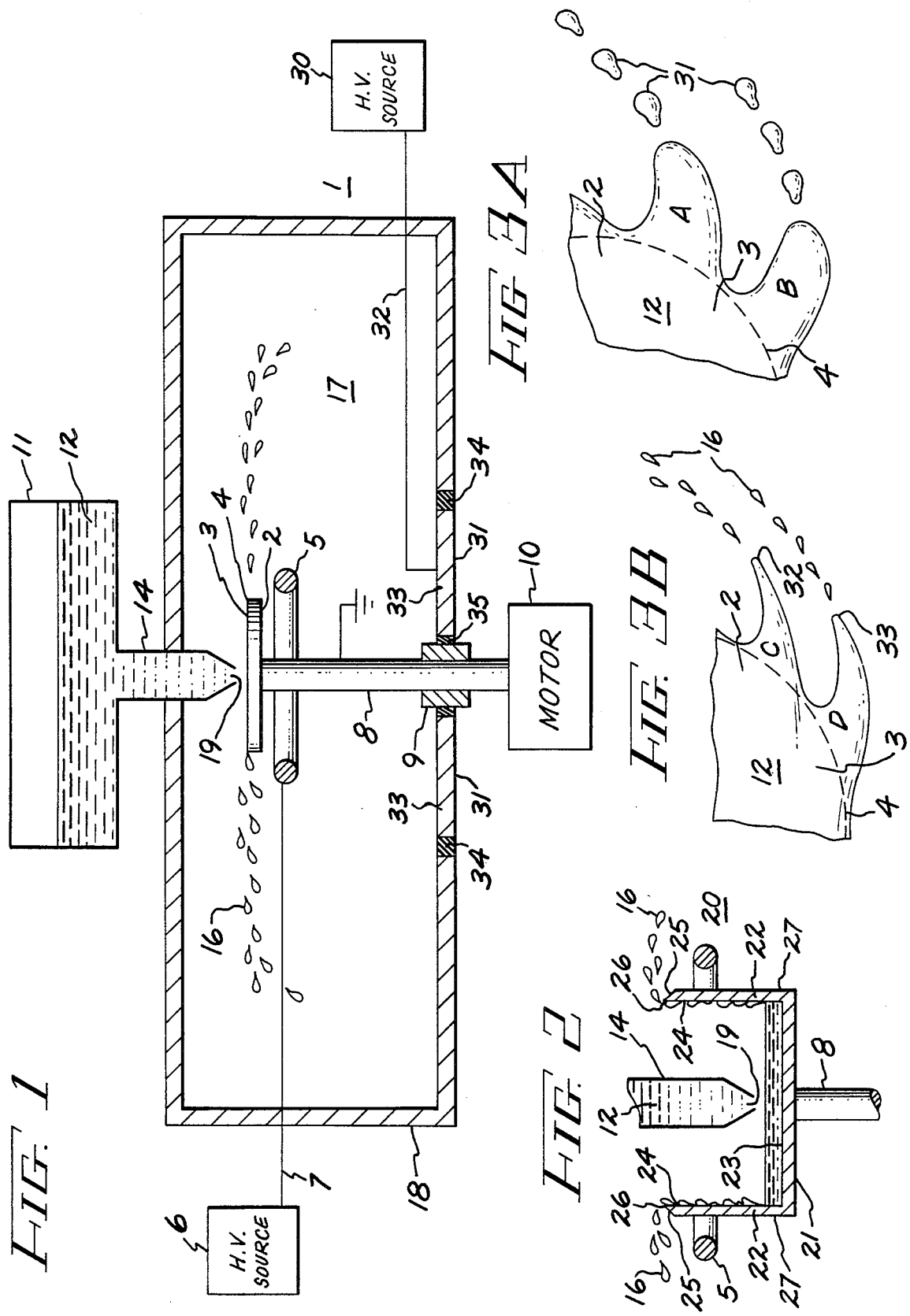

APPARATUS AND METHOD FOR FORMING FINE LIQUID METAL DROPLETS

This application is a continuation of application Ser. No. 580,321 filed 2-15-84 now abandoned.

BACKGROUND OF THE INVENTION

This invention relates to an apparatus and method for forming fine liquid metal droplets. More particularly, it relates to an apparatus and method for forming fine liquid metal droplets wherein the desired average size and dimensional spread about the average size of the droplets can be controlled.

Ideally, an apparatus and method for forming droplets from liquid metal would be capable of producing fine or small metal droplets, e.g. 40 microns in diameter, providing continuous control over droplet size, and generating uniformly-sized droplets. It is also desirable to produce a quantity of droplets to support a commercial or industrial application.

The properties of many advanced alloys depend on the rate at which the metal is cooled. A known method for obtaining high cooling rates comprises generating liquid metal droplets and then exposing them to a cool gas stream. Another known method for obtaining high cooling rates, known as splat-cooling, comprises generating liquid metal droplets and directing them to impact on a cooled surface. The resulting cooled droplets from either method form a powder which may be sintered or hot pressed to form articles.

It has been found that smaller, fine droplets can have superior properties if they can be cooled fast enough to prevent component segregation within the droplet, since a substantially homogeneous structure will result. Such homogeneity will provide intrinsic strength to the finished article. However, the droplets must not be so small as to have too high a surface area per unit volume because a large amount of oxidation may occur, resulting in excessive formation of surface impurities, such as oxides, which become sites for metal fatigue. Also the droplets must not be too large as they become too hard to cool or quench rapidly and also act as fatigue sites in an otherwise relatively homogeneous structure.

The production of small droplets has been addressed in a number of areas. A. D. Moore in "Electrostatics", *Scientific American*, Vol. 226, March 1972, discloses an apparatus for producing paint droplets which uses a spinning bell-shaped member having an electrical charge. Paint at room temperature and pressure is fed to the center of the bell and flows as a film toward the edge where it is subjected to an electric field and forms uniformly spaced streamers. Paint typically has a water or oil base. Thus, the surface tension, i.e. the force which must be overcome to form fine metal droplets, of a liquid or molten metal is significantly greater than that of paint and therefore the strength of the electric field required to overcome this force to form fine metal droplets would cause electrical arcing or dielectric breakdown of the gas at room temperature and pressure. Further, because paint is able to be handled at room temperature, the stresses experienced by the spinning member are unlikely to substantially damage or deform the member.

In "Rapid Solidification Effects of Micron-Size Droplets" by M. R. Glickstein et al., published in *Rapid Solidification Processing*, R. Mehrabian et al. eds., Claitor's Publishing Division, Baton Rouge, 1978, a disk spinning at the rate of 24,000 RPM and disposed in helium at atmospheric pressure is described as being used to form droplets from liquid metal. The droplets display a relatively large size distribution as shown in FIG. 3 therein, where less than 20% of the droplets produced are less than 50 microns in diameter.

In "Electrohydrodynamic Generation of Submicron Particles for Rapid Solidification", by J. Perel et al., published in *Rapid Solidification Processing*, 1978, a capillary tube disposed in a vacuum chamber and having an electric field at one end is described for use in producing liquid metal droplets. The apparatus is intended to be a laboratory set up for generating metal droplets which will be subjected to analytical testing. The relatively small (75 micron) diameter capillary output orifice could be impractical from a commercial standpoint as the molten metal source would have to be substantially free of impurities to prevent fouling of the orifice. Further, the output quantity of 20 grams per day desired by Perel et al. would generally be inadequate to support a commercial operation.

Another method for forming droplets from liquid metal uses high velocity gas jets to atomize a stream of the liquid metal. However, the droplets so formed are generally larger and have a greater size spread than those formed by the other methods previously discussed.

Because the methods as hereinbefore mentioned produce a relatively large spread of droplet sizes, a screening step is typically employed to sort out the undesired sizes. Such handling can lead to impurities being added to the droplets. If smaller, uniformly sized droplets could be produced, the screening step could be eliminated.

SUMMARY OF THE INVENTION

It is an object of the present invention to generate fine metal droplets wherein the size of the droplets can be continuously controlled.

Another object is to generate fine metal droplets wherein the size spread of the droplets around an average size is relatively small.

Another object is to generate fine metal droplets from a liquid high melting point alloy.

Another object is to generate fine metal droplets wherein the quantity of droplets produced is sufficient to support a commercial or industrial application.

In accordance with the present invention, an apparatus for forming fine liquid metal droplets from a liquid metal comprises a chamber wherein the pressure within the chamber is other than ambient atmospheric pressure, a member rotatably mounted within the chamber and having a surface for receiving the liquid metal, means for delivering the liquid metal to the surface of the member, means for forming an electrical field at least at an edge of the surface and means forrotating the member at a predetermined angular velocity.

Further in accordance with the invention, a method for forming fine liquid metal droplets from a liquid metal comprises providing a member having a surface for receiving the liquid metal, disposing the member in an environment having a pressure other than ambient atmospheric pressure, generating an electric field at least at the edge of the surface, directing the liquid metal onto the surface, adjusting the strength of the field to overcome the surface tension of the metal, rotating the member such that at least a portion of the liquid metal is sheared to form droplets and quenching the droplets below the melting temperature of the metal.

The features of the present invention believed to be novel are set forth with particularity in the appended claims. The invention itself, however, both as to organization and method of operation, together with further objects and advantages thereof, may be best understood by reference to the detailed description taken in connection with the accompanying drawing.

DESCRIPTION OF THE DRAWING

FIG. 1 is an elevational partial schematic view of an embodiment of a droplet forming apparatus constructed in accordance with the present invention.

FIG. 2 is an elevational view of a rotatably mounted member constructed in accordance with the present invention.

FIGS. 3A and 3B are partial plan schematic views of liquid metal flow from the edge of a member without and with an electric field, respectively.

DETAILED DESCRIPTION

Illustrated in FIG. 1 is an embodiment of an apparatus 1 for generating fine liquid metal droplets 16 from a liquid metal source 11 (shown schematically), constructed in accordance with the present invention.

The apparatus 1 comprises a chamber 18 wherein the environment 17 is other than ambient atmospheric pressure, i.e. pressurized or evacuated, a member 2, such as a disk, rotatably mounted within the chamber 18 and having a surface 3 adapted to receive a liquid metal, means 14 for delivering the liquid metal 12 from the source 11 to the surface 3 of the member 2, means 5 for forming an electrical field at least at the edge 4 of the surface 3 and means 10 for rotating the member 2. Ambient atmospheric pressure is herein defined to be within the limits of about 0.1 to about 1.5 atmospheres.

The member 2 is affixed to one end of a shaft 8 having the other end thereof attached to a drive or rotating means 10 such as a motor. A bearing 9 is provided to support the shaft 8 and to provide a hermetically sealed interface with the wall of the chamber 18 as the shaft 8 passes therethrough. The drive means 10 could be disposed within the chamber 18 thus obviating the need to have the shaft 8 pass through the wall of the chamber 18.

The means 5 for forming an electrical field may typically comprise at least one ring electrode disposed about the rotational axis of the member 2 and 5 energized from a high voltage energy source 6 through electrical connecting means 7. Generally, the shaft 8 and the member 2 are in electrical communication and at ground potential and the high voltage energy source 6 provides the ring electrode 5 with a negative potential with respect to ground potential. Preferably the ring electrode 5 is concentric with the disk 2 such that uniform electric field at the edge 4 of the disk is produced. Another ring electrode (not shown) may be placed above and concentric with the disk 2 and be energized from the high voltage energy source 6. Thus a cooperating pair of ring electrodes would be provided to shape and form the electric field in order to create the desired droplet characteristics.

Further at least a portion of the chamber 18, as for example a section 31 of a wall thereof, may be electrically insulated from the remaining walls of the chamber 18 and from bearing 9. The bearing 9 will have an electrically insulative region 35 therearound such that the bearing 9 is electrically insulated from the section 31 of the chamber wall. Typically, insulation 34 may be provided so as to form from the wall section 31 an annular electrode 33. The section 31 of the wall may be energized from a second high voltage energy source 30 through electrical connecting means 32 to form an electrode 33 from the energized section 31 of the chamber wall. This electrode 33 may be used either in cooperation with the means 5 for forming an electrical field or independently in order to form an electrical field at least at the edge 4 of the surface 3.

In an embodiment not illustrated, the electrode 5 is at ground potential, the member 2 is electrically insulated from the shaft 8 and the high voltage energy source 6 is electrically connected to the member 2 to provide the member 2 with a positive potential with respect to ground potential. In the aforementioned embodiments of the present invention either potential with respect to ground potential may be used.

Liquid metal 12 may be delivered to the surface 3 of member 2 from a source 11 which is shown schematically. A liquid delivery means 14, such as a hollow tube, is in flow communication with the liquid metal 12. The output orifice 19 of the hollow tube 14 is generally made smaller in diameter than the tube 14 itself in order to better control the flow of liquid metal 12 through the orifice 19. The orifice 19 is oriented to direct liquid metal 12 flowing therefrom onto the surface 3. A conventional valve and control means (not shown) may cooperate with the orifice 19 to further control the rate of flow of liquid metal 12 therethrough. The rate of flow of liquid metal 12 through the orifice 19 may also be controlled by varying the pressure of the liquid metal from the source 11.

In operation, as shown in FIG. 1, the liquid metal is directed from the liquid metal source 11 by the liquid delivery means 14 to orifice 19. From the orifice 19, the liquid metal 12 is directed onto the surface 3 of rotatably mounted member 2. The member 2 is disposed in a chamber 18 wherein the environment 17 is at other than ambient atmospheric pressure. That is, the chamber is either pressurized or evacuated.

Pressurization or evacuation of chamber 18 is necessary in order that the required high voltage can be applied to the ring electrode 4 without electrical arcing or dielectric breakdown of the gas occurring. Preferably the electric field created between electrode 5 and disk 2 is in the range of about $10^6$ to $10^9$ volts/m. Typically, the electrode voltage may be about 60,000 volts. Sufficient energy must be generated in the electrical field to overcome the surface tension of the liquid metal. The dielectric breakdown characteristics of specific gases may be determined from Paschen curves such as those at page 4–133 of the *Standard Handbook for Electrical Engineers,* Fink, ed., McGraw Hill, 1978. A gas such as sulfur hexafluoride, helium, nitrogen, neon or argon which does not react with the liquid metal should be employed. A combination of these gases or other inert gases may be used.

The liquid metal 12 is directed onto the surface 3 of the member 2 as the member 2 is caused to rotate by motor 10. The rotation of member 2 centrifugally forces the liquid metal 12 to flow outwardly from the rotational axis of member 2 along the surface 3 toward the edge 4. In order to form a relatively uniform flow along the surface 3 so that the amount of liquid metal 12 in the flow can be readily controlled, it is preferred that the surface 3 of member 2 be of a material that the liquid metal 12 can wet or show some affinity for. The energized ring electrode 5 is oriented to create an electric field at the edge 4 of the member 2 such that the metal flowing from the surface 3 will be within the electric field.

Referring to FIG. 3A, in the absence of an electric field, as the liquid metal 12 reaches the edge 4 of surface 3, it will create nodules such as A, B from which will emanate or be ejected droplets 31. For a given rotational speed, these droplets will be larger and less uniform than droplets formed in the presence of an electric field having sufficient strength to overcome the surface tension of the liquid metal.

In FIG. 3B is illustrated the formation of liquid metal droplets in accordance with the present invention. The nodules such as C, D created by the liquid metal 12 flowing from the member 2 over the surface 3 to the edge 4 will be finer, for a given rotational speed, than those produced in the absence of an electrical field. The size of droplets emanating from the tips 32, 33 of nodules C, D will be a function of the size of the member 2, the rotational speed of the member 2, the mass flow rate of the liquid metal 12 to the edge 4 of the member 2 and the electric field intensity. Thus by changing the electric field intensity or strength, the size of the droplets produced can be changed. The electric field must have sufficient strength to overcome the surface tension of the liquid metal in the nodules C, D in order for the desired sized droplets 16 to be formed. Thus for a desired droplet size, slower rotational speeds may be used with the present invention than with liquid metal droplet-forming apparatus not employing an electrical field, and the slower speed in turn reduces the stresses on the rotating member 2.

Illustrated in FIG. 2 is another embodiment of the invention, which employs a member 20 in place of member 2 in FIG. 1. The member 20 is cup-like having a transverse base section 21 and a cylindrical section forming side 22 connected thereto, and may be mounted on the shaft 8 as hereinbefore described. Of course other configurations of rotary member may be used, as for instance a cup-like member having tapered sides whereby the size of the interior at the base is greater than the opening at the top.

Liquid metal 12 is delivered by means 14 to orifice 19. The orifice 19 is oriented to direct the liquid metal 12 onto the inner surface 23 of member 20. Rotation of the member 20 will cause the liquid metal 12 to flow along the surface 23 and then along the inner surface 24 of the side 22. As the liquid metal 12 reaches the edge 25 of the side 22, it will be abruptly formed into droplets 16, the size of which may be controlled by the strength of the electrical field created by ring electrode 5 as hereinbefore described.

The rim 26 of the member 20 is beveled such that the inner surface 24 extends further than the outer surface 27 of the cylindrical section. This beveled section increases the electric field intensity in the region where the liquid metal droplets are formed. The intensity of the field can be changed by altering the angle of the bevel. The bevel also provides a surface relief to prevent metal from adhering the rim and being drawn down along the outer surface 27. The bevel may also have the outer surface 27 extend further than the inner surface 24.

An inherent advantage of metal droplet formation using the present invention is obtained because the droplets will acquire an electrical charge from the electrical field. Droplets will be charged with like polarity thus causing them to repel each other. This repulsion prevents droplets from overtaking or combining with other droplets before they are quenched and thus avoids the formation of large sized droplets.

The apparatus of the present invention would be capable of producing fine liquid metal droplets having an average diameter of 40 microns wherein substantially all the droplets are less than 80 microns in diameter. The speed of rotation should be about 500 to about 30,000 RPM and the electric field strength about $10^6$ to about $10^9$ volts per meter. About 5000 RPM is a preferred speed of rotation.

Prior methods for generating liquid metal droplets have problems associated therewith. In Glickstein et al. publication hereinbefore mentioned, a disk spinning at the rate of 24,000 RPM and disposed in helium at atmospheric pressure is used to form droplets from liquid metal. In this configuration, the average size of the droplets produced is proportional to the rate at which the disk is spun. However, the spread of the size of the droplets produced about the average is relatively large and is not readily susceptible to control, and thus quantities of particles which are larger or smaller than desired are produced. As hereinbefore explained, droplets which are either too large or too small are considered undesirable as they may form fatigue sites in a finished article if they are not removed prior to further processing.

Additional problems are encountered when using the approach disclosed by Glickstein et al. In order to obtain a small droplet size, the disk must spin at a relatively high rate, as for instance the disclosed rate of 24,000 RPM. When trying to form droplets from a molten metal, especially from a superalloy which is often nickel based and typically has a melting point of about 1500° C., it is difficult to find a material for the disk which will not exhibit excessive creep and structural deformation at the temperature and forces involved. The stress on a rotating disk is approximately proportional to the square of the angular velocity. Since the apparatus and method of the present invention may permit a rotating member to generate droplets of the size generated by Glickstein et al. at a speed of about 5000 RPM, the stresses on the rotating member of the present invention would be about twenty-five times less than those on a rotating disk as described by Glickstein et al.

It is also beneficial for the control of the molten metal as it flows across the surface of the disk that the surface be wetted by the molten metal. With this additional constraint, along with the ability to withstand the high temperatures of the superalloys and the stresses of a rapidly rotating disk, it is difficult to obtain a material which is practical and economical for disk manufacture. The slower rotational speeds permitted by the present invention not only reduce the stress on the rotating member, but also increase the number of materials which can be selected because they are capable of withstanding the stress and satisfying the surface wetting criterion.

Although gas atomization of molten metal is another technique that may be used to form liquid metal droplets, the resulting droplet size distribution or spread is generally large and the subsequent handling, such as screening, required to obtain the desired sizes may detrimentally lead to impurities being added.

The foregoing describes apparatus and methods for forming fine metal droplets wherein the size of droplet can be continuously controlled by an applied electric field. The electric field provides for the formation of more uniform droplets and permits a slower rotational speed for a spinning member from which the droplets are flung than an apparatus not employing an electrical field to form the same size droplets. These slower rotational speeds allow a high melting or superalloy to be handled much more economically and efficiently. Further, relatively high mass flow rates of the molten metal are obtainable with the present invention, thus making the present invention practical for meeting commercial requirements.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. An apparatus for forming fine liquid metal droplets from a liquid metal comprising:
   (a) a chamber wherein the pressure within said chamber is greater than about 1.5 atmospheres;
   (b) a member rotatably mounted within said chamber and having a surface for receiving said liquid metal;
   (c) means for delivering said liquid metal to said surface of said member;
   (d) means for forming an electrical field at least at the edge of said surface sufficient to overcome the surface tension of said metal; and
   (e) means for rotating said member at a predetermined angular velocity.

2. An apparatus as in claim 1 wherein said means for forming an electrical field comprises at least one ring electrode disposed about the rotational axis of said member.

3. An apparatus as in claim 2 wherein said member comprises a disk and said ring electrode is concentric with said disk.

4. An apparatus as in claim 1 wherein the environment within said chamber is substantially nitrogen.

5. An apparatus as in claim 1 wherein the environment within said chamber is substantially argon.

6. An apparatus as in claim 1 wherein the environment within said chamber is substantially helium.

7. An apparatus as in claim 1 wherein said member comprises a transverse base section and a cylindrical section affixed thereto so as to form a cup like configuration.

8. An apparatus as in claim 7 wherein the rim of said cylindrical section is beveled such that the inner surface of said cylindrical section extends further than the outer surface of said cylindrical section.

9. An apparatus as in claim 1 wherein said means for forming an electrical field comprises at least a portion of a wall of said chamber.

10. An apparatus as in claim 1 further comprising a second means for forming an electrical field at least at the edge of said surface.

11. An apparatus as in claim 10 wherein said second means for forming an electrical field comprises at least a portion of a wall of said chamber.

12. An apparatus as in claim 1 wherein the environment within said chamber is substantially sulfur hexafluoride.

13. An apparatus as in claim 1 wherein the environment within said chamber is a mixture of inert gases.

14. A method for forming fine liquid metal droplets from a liquid metal comprising the steps of:
   (a) providing a member having a surface for receiving said liquid metal;
   (b) situating said member in an environment having a pressure greater than about 1.5 atmospheres;
   (c) generating an electric field at least at the edge of said surface sufficient to overcome the surface tension of said metal;
   (d) directing said liquid metal onto said surface; and
   (e) rotating said member at a predetermined angular velocity such that at least a portion of said liquid metal is sheared to form droplets.

15. A method as in claim 14 wherein said environment comprises a gas which is non-reactive with said liquid metal.

16. A method as in claim 15 wherein said gas comprises nitrogen.

17. A method as in claim 15 wherein said gas comprises argon.

18. A method as in claim 15 wherein said gas comprises helium.

19. A method as in claim 15 wherein said gas comprises sulfur hexafluoride.

20. A method as in claim 15 wherein said gas comprises a mixture of inert gases.

21. A method as in claim 14 wherein said step of generating said electric field includes adjusting the strength thereof such that the average size of said droplets is about 40 microns in diameter and substantially all the droplets are less than about 80 microns in diameter.

22. A method as in claim 19 wherein the strength of the electric field is the range of about $10^6$ to about $10^9$ volts/m.

23. A method as in claim 14 wherein the angular velocity of said member is in the range of about 500 to about 30,000 RPM.

* * * * *